United States Patent
Quan et al.

(10) Patent No.: US 10,772,122 B2
(45) Date of Patent: Sep. 8, 2020

(54) METHOD FOR RANDOM ACCESS IN IDLE STATE AND DEVICE

(71) Applicant: Huawei Technologies Co., Ltd., Shenzhen, Guangdong (CN)

(72) Inventors: Wei Quan, Beijing (CN); Zhenxing Hu, Shenzhen (CN); Jian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 172 days.

(21) Appl. No.: 15/012,650

(22) Filed: Feb. 1, 2016

(65) Prior Publication Data
US 2016/0150564 A1 May 26, 2016

Related U.S. Application Data

(63) Continuation of application No. PCT/CN2013/080702, filed on Aug. 2, 2013.

(51) Int. Cl.
*H04W 74/00* (2009.01)
*H04L 29/12* (2006.01)
(Continued)

(52) U.S. Cl.
CPC ....... *H04W 74/004* (2013.01); *H04L 61/6054* (2013.01); *H04W 28/0278* (2013.01);
(Continued)

(58) Field of Classification Search
None
See application file for complete search history.

(56) References Cited

U.S. PATENT DOCUMENTS

| 8,406,179 B2 | 3/2013 | Kim et al. |
| 2009/0052388 A1* | 2/2009 | Kim ............ H04W 74/002 370/329 |

(Continued)

FOREIGN PATENT DOCUMENTS

| CN | 101674661 A | 3/2010 |
| WO | WO 2012/108046 A1 | 8/2012 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.4.0, Jun. 2013, 346 pages.

(Continued)

*Primary Examiner* — Jason E Mattis
*Assistant Examiner* — Hong Shao
(74) *Attorney, Agent, or Firm* — Stein IP, LLC

(57) ABSTRACT

Embodiments of the present invention provide a method for random access in an idle state and a device. The method includes: sending, by user equipment (UE), a random access preamble to a evolved NodeB (eNB), and receiving a random access response message that is sent by the eNB according to the random access preamble; sending, by the UE, a first message to the eNB according to first uplink grant information; and receiving, by the UE, second uplink grant information sent by the eNB, and sending to-be-sent data to the eNB according to the second uplink grant information. According to the method for random access in an idle state and the device provided in the embodiments of the present invention, accuracy of uplink resource allocation is improved during random access of UE in an idle state.

22 Claims, 8 Drawing Sheets

User equipment UE sends a random access preamble to a base station eNB, and receives a random access response message that is sent by the eNB according to the random access preamble, where the random access response message carries first uplink grant information — U10

The UE sends a first message to the eNB according to the first uplink grant information, where the first message carries a buffer status report BSR, and the BSR is used to indicate a volume of to-be-sent data of the UE, so that the eNB allocates an uplink resource to the UE according to the BSR — U20

The UE receives second uplink grant information sent by the eNB, and sends the to-be-sent data to the eNB according to the second uplink grant information, where the second uplink grant information is used to indicate the uplink resource allocated to the UE by the eNB — U30

(51) Int. Cl.
*H04W 28/02* (2009.01)
*H04W 74/08* (2009.01)
*H04W 72/12* (2009.01)

(52) U.S. Cl.
CPC ....... *H04W 72/1278* (2013.01); *H04L 61/103* (2013.01); *H04W 72/1242* (2013.01); *H04W 74/0833* (2013.01)

(56) References Cited

U.S. PATENT DOCUMENTS

| | | | | |
|---|---|---|---|---|
| 2012/0307700 | A1* | 12/2012 | Nordberg | H04W 52/0206 370/311 |
| 2013/0279446 | A1* | 10/2013 | Lv | H04L 5/001 370/329 |
| 2013/0301611 | A1* | 11/2013 | Baghel | H04W 72/04 370/331 |
| 2013/0322339 | A1 | 12/2013 | Ohta et al. | |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.6.0, Jun. 2013, 209 pages.

"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.3.0, Jun. 2013, 57 pages.

\* cited by examiner

| R | R | E | LCID |
|---|---|---|---|
| UE ID ||||
| UE ID ||||
| UE ID ||||
| UE ID ||||
| UE ID ||||
| BSR || R | R |

FIG. 2

| R | R | E | LCID |
|---|---|---|---|
| UE ID ||||
| UE ID ||||
| UE ID ||||
| UE ID ||||
| UE ID ||||
| LCG ID | BSR |||

FIG. 3

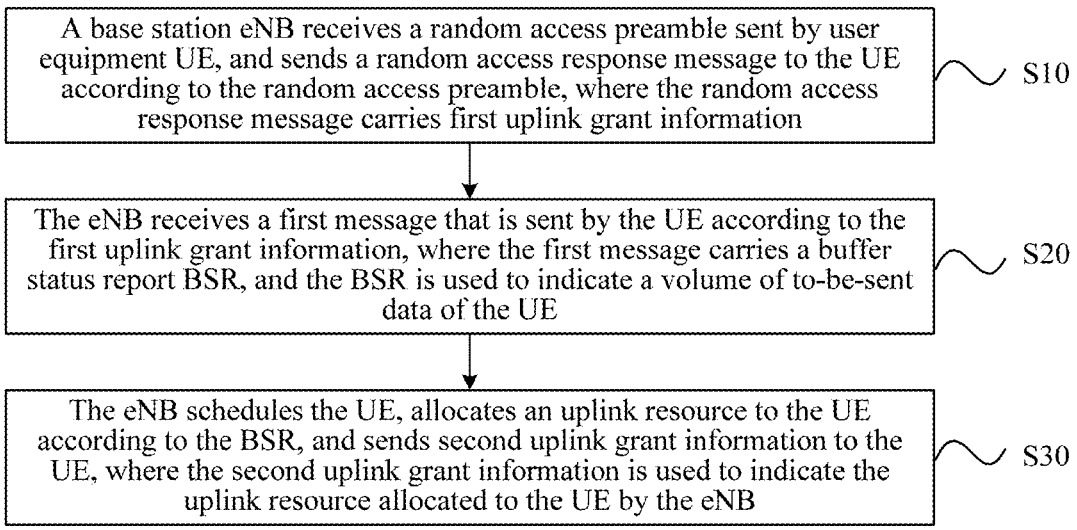

METHOD FOR RANDOM ACCESS IN IDLE STATE AND DEVICE

CROSS-REFERENCE TO RELATED APPLICATIONS

This application is a continuation of International Application No. PCT/CN2013/080702, filed on Aug. 2, 2013, which is hereby incorporated by reference in its entirety.

TECHNICAL FIELD

Embodiments of the present invention relate to communications technologies, and in particular, to a method for random access in an idle state and a device.

BACKGROUND

In an long term evolution_(LTE) communications system and a long term evolution advanced (LTE-A) communications system, when user equipment_(UE) is not performing a service or is not receiving or sending data, the UE may generally be in an idle state. When the UE needs to set up a service, or to receive or send data, the UE needs to switch from an idle state to a connected state before receiving or sending data.

During random access, the UE selects a random access preamble and sends the random access preamble to an evolved NodeB (eNB), and the eNB allocates an uplink resource to the UE according to the random access preamble. The random access preamble can reflect only that a volume of data to be sent subsequently by the UE is greater than or less than a threshold, and when the data to be sent by the UE is greater than the threshold, the eNB cannot accurately obtain a volume of the data according to the received random access preamble that is sent by the UE. Therefore, the base station cannot allocate resources accurately, which easily results in wasting of resources, or uplink data is transmitted for multiple times, which not only wastes a scheduling command but also leads to a transmission delay.

SUMMARY

Embodiments of the present invention provide a method for random access in an idle state and a device, to improve accuracy of uplink resource allocation during random access of UE in an idle state.

According to a first aspect, an embodiment of the present invention provides a method for random access in an idle state, including:

sending, by user equipment UE, a random access preamble to a base station, and receiving a random access response message that is sent by the eNB according to the random access preamble, where the random access response message carries first uplink grant information;

sending, by the UE, a first message to the eNB according to the first uplink grant information, where the first message carries a buffer status report BSR, and the BSR is used to indicate a volume of to-be-sent data of the UE, so that the eNB allocates an uplink resource to the UE according to the BSR; and receiving, by the UE, second uplink grant information sent by the eNB, and sending the to-be-sent data to the eNB according to the second uplink grant information, where the second uplink grant information is used to indicate the uplink resource allocated to the UE by the eNB.

In a first possible implementation manner, the BSR is a short BSR or a long BSR.

In a second possible implementation manner, after the sending, by the UE, a first message to the eNB, and before the receiving, by the UE, second uplink grant information sent by the eNB, the method further includes:

receiving, by the UE, a contention resolution message sent by the eNB, and determining whether the contention resolution message carries information that is sent by the UE to the eNB by using the first message, where if yes, contention resolution succeeds.

In a third possible implementation manner, the first message further carries data priority information used to indicate a priority of the to-be-sent data or equipment priority information used to indicate a priority of the UE.

In a fourth possible implementation manner, the sending, by the UE, a first message to the eNB according to the first uplink grant information is specifically:

if the UE determines that an uplink resource indicated by the first uplink grant information cannot bear the to-be-sent data, sending, by the UE, the first message to the eNB.

With reference to the fourth possible implementation manner of the first aspect, in a fifth possible implementation manner, the method for random access in an idle state further includes:

if the UE determines that the uplink resource indicated by the first uplink grant information can bear the to-be-sent data, sending, by the UE, a second message to the eNB, where the second message carries the to-be-sent data.

In a sixth possible implementation manner, before the sending, by UE, a random access preamble to a base station, the method further includes:

determining, by the UE, a random access code group from at least three random access code groups according to the to-be-sent data, and randomly selecting a random access preamble from the determined random access code group.

In a seventh possible implementation manner, the first message further includes: a message identifier used to indicate that the first message carries the BSR, and a UE identity, where the message identifier of the BSR includes a logical channel number, and the UE identity includes a temporary mobile subscriber identity, an international mobile subscriber identity, or an international mobile equipment identity of the UE.

In an eighth possible implementation manner, before the sending, by the UE, a first message to the eNB according to the first uplink grant information, the method further includes:

receiving, by the UE, a BSR configuration parameter delivered by a network side device, and generating the BSR according to the BSR configuration parameter.

According to a second aspect, an embodiment of the present invention provides a method for random access in an idle state, including:

receiving, by a base station, a random access preamble sent by user equipment UE, and sending a random access response message to the UE according to the random access preamble, where the random access response message carries first uplink grant information;

receiving, by the eNB, a first message that is sent by the UE according to the first uplink grant information, where the first message carries a buffer status report BSR, and the BSR is used to indicate a volume of to-be-sent data of the UE; and scheduling, by the eNB, the UE, allocating an uplink resource to the UE according to the BSR, and sending second uplink grant information to the UE, where the second uplink grant information is used to indicate the uplink resource allocated to the UE by the eNB.

In a first possible implementation manner, after the receiving, by the eNB, a first message that is sent by the UE according to the first uplink grant information, and before the allocating, by the eNB, an uplink resource to the UE according to the BSR, the method further includes:

sending, by the eNB, a contention resolution message, where the contention resolution message carries information that is sent by the UE to the eNB by using the first message.

In a second possible implementation manner, the first message further carries data priority information used to indicate a priority of the to-be-sent data or equipment priority information used to indicate a priority of the UE; and the scheduling, by the eNB, the UE is specifically:

scheduling, by the eNB, the UE according to the data priority information or the equipment priority information.

In a third possible implementation manner, the random access response message further carries a temporary cell radio network temporary identifier C-RNTI that is allocated to the UE by the eNB, and the first message further carries a user equipment identity; and the method further includes:

establishing, by the eNB, a mapping relationship between the temporary C-RNTI and the user equipment identity; and when downlink data of the UE arrives, determining, by the eNB, the temporary C-RNTI according to the user equipment identity in the downlink data, and scheduling the UE according to the temporary C-RNTI, or determining, by the eNB, the temporary C-RNTI according to the user equipment identity in a paging message that is received from a core network, and paging the UE according to the temporary C-RNTI.

In a fourth possible implementation manner, the first message further includes: a message identifier used to indicate that the first message carries the BSR, and a UE identity, where the message identifier of the BSR includes a logical channel number, and the UE identity includes a temporary mobile subscriber identity, an international mobile subscriber identity, or an international mobile equipment identity of the UE.

According to a third aspect, an embodiment of the present invention provides user equipment, including:

a first transmission unit, configured to send a random access preamble to a base station, and receive a random access response message that is sent by the eNB according to the random access preamble, where the random access response message carries first uplink grant information;

a second transmission unit, configured to send a first message to the eNB according to the first uplink grant information, where the first message carries a buffer status report BSR, and the BSR is used to indicate a volume of to-be-sent data of the UE, so that the eNB allocates an uplink resource to the UE according to the BSR; and a third transmission unit, configured to receive second uplink grant information sent by the eNB, and send the to-be-sent data to the eNB according to the second uplink grant information, where the second uplink grant information is used to indicate the uplink resource allocated to the user equipment UE by the eNB.

In a first possible implementation manner, the BSR is a short BSR or a long BSR.

In a second possible implementation manner, the second transmission unit is further configured to receive a contention resolution message sent by the eNB; and the user equipment further includes a processing unit, configured to determine whether the contention resolution message carries information that is sent by the UE to the eNB by using the first message, where if yes, contention resolution succeeds.

In a third possible implementation manner, the first message further carries data priority information used to indicate a priority of the to-be-sent data or equipment priority information used to indicate a priority of the UE.

In a fourth possible implementation manner, the second transmission unit is specifically configured to: if it is determined that an uplink resource indicated by the first uplink grant information cannot bear the to-be-sent data, send the first message to the eNB.

With reference to the fourth possible implementation manner of the third aspect, in a fifth possible implementation manner, the user equipment further includes:

a fourth transmission unit, configured to: if it is determined that the uplink resource indicated by the first uplink grant information can bear the to-be-sent data, send a second message to the eNB, where the second message carries the to-be-sent data.

In a sixth possible implementation manner, the first transmission unit is further configured to determine a random access code group from at least three random access code groups according to the to-be-sent data, and randomly select a random access preamble from the determined random access code group.

In a seventh possible implementation manner, the first message further includes: a message identifier used to indicate that the first message carries the BSR, and a UE identity, where the message identifier of the BSR includes a logical channel number, and the UE identity includes a temporary mobile subscriber identity, an international mobile subscriber identity, or an international mobile equipment identity of the UE.

In an eighth possible implementation manner, the second transmission unit is further configured to receive a BSR configuration parameter delivered by a network side device, and generate the BSR according to the BSR configuration parameter.

According to a fourth aspect, an embodiment of the present invention provides a base station, including:

a first transmission unit, configured to receive a random access preamble sent by user equipment UE, and send a random access response message to the UE according to the random access preamble, where the random access response message carries first uplink grant information;

a second transmission unit, configured to receive a first message that is sent by the UE according to the first uplink grant information, where the first message carries a buffer status report BSR, and the BSR is used to indicate a volume of to-be-sent data of the UE;

a processing unit, configured to schedule the UE, and allocate an uplink resource to the UE according to the BSR; and a third transmission unit, configured to send second uplink grant information to the UE, where the second uplink grant information is used to indicate the uplink resource allocated to the UE by the base station.

In a first possible implementation manner, the second transmission unit is further configured to send a contention resolution message, where the contention resolution message carries information that is sent by the UE to the eNB by using the first message.

In a second possible implementation manner, the first message further carries data priority information used to indicate a priority of the to-be-sent data or equipment priority information used to indicate a priority of the UE; and the processing unit is specifically configured to schedule the UE according to the data priority information or the equipment priority information.

In a third possible implementation manner, the random access response message further carries a temporary cell radio network temporary identifier C-RNTI that is allocated to the UE by the eNB, and the first message further carries a user equipment identity; and the processing unit is further configured to establish a mapping relationship between the temporary C-RNTI and the user equipment identity; and when downlink data of the UE arrives, determine, by the eNB, the temporary C-RNTI according to the user equipment identity in the downlink data, and schedule the UE according to the temporary C-RNTI, or determine, by the eNB, the temporary C-RNTI according to the user equipment identity in a paging message that is received from a core network, and page the UE according to the temporary C-RNTI.

In a fourth possible implementation manner, the first message further includes: a message identifier used to indicate that the first message carries the BSR, and a UE identity, where the message identifier of the BSR includes a logical channel number, and the UE identity includes a temporary mobile subscriber identity, an international mobile subscriber identity, or an international mobile equipment identity of the UE.

According to a fifth aspect, an embodiment of the present invention provides user equipment, including:

a sender, configured to send a random access preamble to a base station;

a receiver, configured to receive a random access response message that is sent by the eNB according to the random access preamble, where the random access response message carries first uplink grant information; and a processor, configured to send a first message to the eNB according to the first uplink grant information by using the sender, where the first message carries a buffer status report BSR, and the BSR is used to indicate a volume of to-be-sent data of the UE, so that the eNB allocates an uplink resource to the UE according to the BSR, where the receiver is further configured to receive second uplink grant information sent by the eNB, where the second uplink grant information is used to indicate the uplink resource allocated to the user equipment UE by the eNB; and the processor is further configured to send the to-be-sent data to the eNB according to the second uplink grant information by using the sender.

In a first possible implementation manner, the BSR is a short BSR or a long BSR.

In a second possible implementation manner, the receiver is further configured to receive a contention resolution message sent by the eNB; and the processor is further configured to determine whether the contention resolution message carries information that is sent by the UE to the eNB by using the first message, where if yes, contention resolution succeeds.

In a third possible implementation manner, the first message further carries data priority information used to indicate a priority of the to-be-sent data or equipment priority information used to indicate a priority of the UE.

In a fourth possible implementation manner, the processor is further configured to: if determining that an uplink resource indicated by the first uplink grant information cannot bear the to-be-sent data, send the first message to the eNB by using the sender.

With reference to the fourth possible implementation manner of the fifth aspect, in a fifth possible implementation manner, the processor is further configured to: if determining that the uplink resource indicated by the first uplink grant information can bear the to-be-sent data, send a second message to the eNB by using the sender, where the second message carries the to-be-sent data.

In a sixth possible implementation manner, the processor is further configured to determine a random access code group from at least three random access code groups according to the to-be-sent data, and randomly select a random access preamble from the determined random access code group.

In a seventh possible implementation manner, the first message further includes: a message identifier used to indicate that the first message carries the BSR, and a UE identity, where the message identifier of the BSR includes a logical channel number, and the UE identity includes a temporary mobile subscriber identity, an international mobile subscriber identity, or an international mobile equipment identity of the UE.

In an eighth possible implementation manner, the receiver is further configured to receive a BSR configuration parameter delivered by a network side device, and generate the BSR according to the BSR configuration parameter.

According to a sixth aspect, an embodiment of the present invention provides a base station, including:

a receiver, configured to receive a random access preamble sent by user equipment UE;

a sender, configured to send a random access response message to the UE according to the random access preamble, where the random access response message carries first uplink grant information, where the receiver is further configured to receive a first message that is sent by the UE according to the first uplink grant information, where the first message carries a buffer status report BSR, and the BSR is used to indicate a volume of to-be-sent data of the UE; and a processor, configured to schedule the UE, and allocate an uplink resource to the UE according to the BSR, where the sender is further configured to send second uplink grant information to the UE, where the second uplink grant information is used to indicate the uplink resource allocated to the UE by the base station.

In a first possible implementation manner, the sender is further configured to send a contention resolution message, where the contention resolution message carries information that is sent by the UE to the eNB by using the first message.

In a second possible implementation manner, the first message further carries data priority information used to indicate a priority of the to-be-sent data or equipment priority information used to indicate a priority of the UE; and the processor is specifically configured to schedule the UE according to the data priority information or the equipment priority information.

In a third possible implementation manner, the random access response message further carries a temporary cell radio network temporary identifier C-RNTI that is allocated to the UE by the eNB, and the first message further carries a user equipment identity; and the processor is further configured to establish a mapping relationship between the temporary C-RNTI and the user equipment identity; and when downlink data of the UE arrives, determine, by the eNB, the temporary C-RNTI according to the user equipment identity in the downlink data, and schedule the UE according to the temporary C-RNTI, or determine, by the eNB, the temporary C-RNTI according to the user equipment identity in a paging message that is received from a core network, and page the UE according to the temporary C-RNTI.

In a fourth possible implementation manner, the first message further includes: a message identifier used to indicate that the first message carries the BSR, and a UE identity, where the message identifier of the BSR includes a logical channel number, and the UE identity includes a temporary mobile subscriber identity, an international mobile subscriber identity, or an international mobile equipment identity of the UE.

According to the method for random access in an idle state and the device provided in the embodiments of the present invention, because UE in an idle state reports a volume of to-be-sent data to an eNB by using a BSR in a random access process, the eNB can accurately allocate an uplink resource to the UE, so that accuracy of uplink resource allocation is improved during random access of the UE in the idle state.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 2 is a schematic diagram of a format of a first message according to an embodiment of the present invention;

FIG. 3 is a schematic diagram of another format of a first message according to an embodiment of the present invention;

FIG. 6 is a schematic diagram of a format of a message 3 according to an embodiment of the present invention;

FIG. 7 is a schematic diagram of another format of a message 3 according to an embodiment of the present invention;

FIG. 8 is a flowchart of another method for random access in an idle state according to an embodiment of the present invention;

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
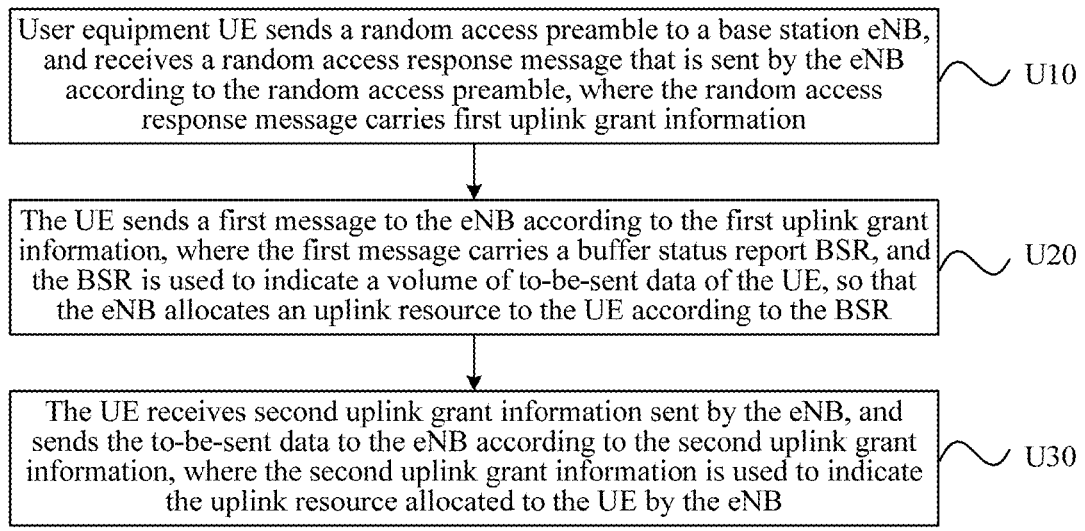
FIG. 1 is a flowchart of a method for random access in an idle state according to an embodiment of the present invention.

FIG. 1 is a flowchart of a method for random access in an idle state according to an embodiment of the present invention. As shown in FIG. 1, the method for random access in an idle state provided in this embodiment may be specifically applied to a random access process of UE in an idle state in a communications system. The communications system may be, but is not limited to, an LTE communications system or an LTE-A communications system. The method for random access in an idle state provided in this embodiment specifically includes:

Step U10: The user equipment UE sends a random access preamble to a base station, and receives a random access response message that is sent by the eNB according to the random access preamble, where the random access response message carries first uplink grant information.

Step U20: The UE sends a first message to the eNB according to the first uplink grant information, where the first message carries a buffer status report BSR, and the BSR is used to indicate a volume of to-be-sent data of the UE, so that the eNB allocates an uplink resource to the UE according to the BSR.

Step U30: The UE receives second uplink grant information sent by the eNB, and sends the to-be-sent data to the eNB according to the second uplink grant information, where the second uplink grant information is used to indicate the uplink resource allocated to the UE by the eNB.

Specifically, for UE in an idle state to switch to a connected state, a random access process is needed. In the random access process, the UE selects a random access preamble from a random access code group that is preconfigured by an eNB, and sends the random access preamble to the eNB. There may be one or more random access code groups. In an implementation manner, a format of a first message to be sent by the UE is fixed, and a size of the first message is also fixed; in this case, there may be one random access code group. In another implementation manner, the size of the first message is not fixed, and there may be multiple random access code groups, for example, there are two random access code groups: a group A and a group B. The UE may select a random access preamble according to the size of the first message that is to be sent to the eNB. For example, a threshold configured by the eNB for selecting a random access code group is set to 56 bits (bit). When the size of the first message to be sent by the UE is less than or equal to 56 bits, the UE selects a random access preamble from the group A and sends the random access preamble to the eNB. When the size of the first message to be sent by the UE is greater than 56 bits, the UE selects a random access preamble from the group B and sends the random access preamble to the eNB. Optionally, the threshold may be 144 bits or another value.

The eNB allocates, to the UE according to the random access preamble sent by the UE, an uplink resource used to bear the first message. The eNB sends a random access response message to the UE, where the random access response message carries first uplink grant information, and the first uplink grant information is used to indicate the uplink resource that is allocated to the UE and that is used to bear the first message. The first uplink grant information may include information such as a time-frequency resource and a modulation and coding scheme. The random access response message may further carry a temporary cell radio network temporary identifier (C-RNTI) that is allocated to the UE by the eNB.

The UE sends a first message according to the first uplink grant information, where the first message may be a message 3, the first message carries a buffer status report (BSR), and the BSR is used to indicate a volume of to-be-sent data. When receiving the first message, the eNB can learn, according to the BSR, the volume of the data to be sent by the UE, and allocate, to the UE, an uplink resource that can bear the to-be-sent data. The eNB sends second uplink grant information to the UE, where the second uplink grant information is used to indicate the uplink resource that is allocated to the UE by the eNB and that is used to transmit the to-be-sent data. The second uplink grant information may include information such as a time-frequency resource and a modulation and coding scheme. The UE sends the data to the eNB according to the second uplink grant information.

In the method for random access in an idle state provided in this embodiment, UE sends a random access preamble to an eNB, and receives a random access response message that is sent by the eNB according to the random access preamble, where the random access response message carries first uplink grant information; the UE sends a first message to the eNB according to the first uplink grant information, where the first message carries a BSR, and the BSR is used to indicate a volume of to-be-sent data of the UE, so that the eNB allocates an uplink resource to the UE according to the BSR; and the UE receives second uplink grant information sent by the eNB, and sends the to-be-sent data to the eNB according to the second uplink grant information, where the second uplink grant information is used to indicate the uplink resource allocated to the UE by the eNB. Because UE in an idle state reports a volume of to-be-sent data to an eNB by using a BSR in a random access process, the eNB can accurately allocate an uplink resource to the UE, so that accuracy of uplink resource allocation is improved during random access of the UE in the idle state.

In an actual implementation process, the first message further carries a user equipment identity (UE ID) of the UE. The user equipment identity may specifically include an identity allocated to the UE by a core network device, for example, but not limited to, an s-temporary mobile subscriber identity (S-TMSI), a temporary mobile subscriber identity (P-TMSI), an international mobile subscriber identity (IMSI), an international mobile equipment identity (IMEI), or a random number. The first message may further carry a message identifier that is used to indicate a type of the first message. The message identifier may be implemented by using a logical channel number (logic channel identity, LCID). An LCID value that is not used in existing standards may be used for the LCID. For example, at present, LCID values from 01011 to 11000 are currently reserved values. For example, 11000 may be used as the LCID value in this embodiment of the present invention, to notify the eNB that the first message carries the BSR.

In an implementation manner, using a first message having a size of 56 bits as an example, the format of the first message may be shown in FIG. 2, including the following information:

message identifier (LCID): 5 bits, where the identifier is used to notify the eNB that an objective of the current random access process is to report the BSR, or to indicate that the first message carries BSR information;

UE identity: 40 bits, where the UE identity may be an S-TMSI, a P-TMSI, an IMSI, or an IMEI of the UE, or may be a random number;

BSR: 6 bits, where this field is used to report a volume of data buffered by the UE, and a BSR index table the same as that in a connected state may be used; in this case, it is assumed that all data that the UE needs to send belongs to a same logical channel group (LCG), or it is considered that the reported BSR is not related to an LCG, but only represents how much data the UE needs to send;

extended (E): 1 bit; and reservation (R): 4 bits. If the size of the first message is 144 bits, extra bits may be padded using 0 or 1.

In this embodiment, the BSR is a short BSR or a long BSR. When the BSR uses a short BSR format, the BSR includes an LCG ID field and a Buffer Size (buffer size) field. As shown in FIG. 3, in another implementation manner shown in the FIG. 3, a format of the first message differs from the format of the first message shown in FIG. 2 in that: two R bits are used to transmit an LCG ID, where the LCG ID may be padded with an arbitrary value, or may be padded with a suitable value according to a requirement.

When the data to be sent by the UE includes data of multiple types, the data may be divided into several LCGs according to the data types, and the BSR uses a long BSR format to report a data volume of each LCG.

In this embodiment, before the sending, by the UE, a first message to the eNB according to the first uplink grant information, the method may further include:

receiving, by the UE, a BSR configuration parameter delivered by a network side device, and generating the BSR according to the BSR configuration parameter.

Optionally, before the UE sends a BSR, a BSR configuration parameter may be obtained. The configuration parameter may be specifically: information such as whether to report a long BSR or a short BSR, and that data of which types belongs to a same LCG when a long BSR is reported. The configuration parameter may be notified by a network side. A specific notification method may be: notifying the configuration parameter by using a broadcast message, adding the configuration parameter to the random access response message, notifying the configuration parameter by using another message, or specifying the configuration parameter in a protocol, for example, specifying that a short BSR is reported.

Only several implementation manners of the first message are provided in this embodiment, and persons skilled in the art may set the format of the first message according to an actual transmission requirement, which is not limited in the present invention.

Figure 4:
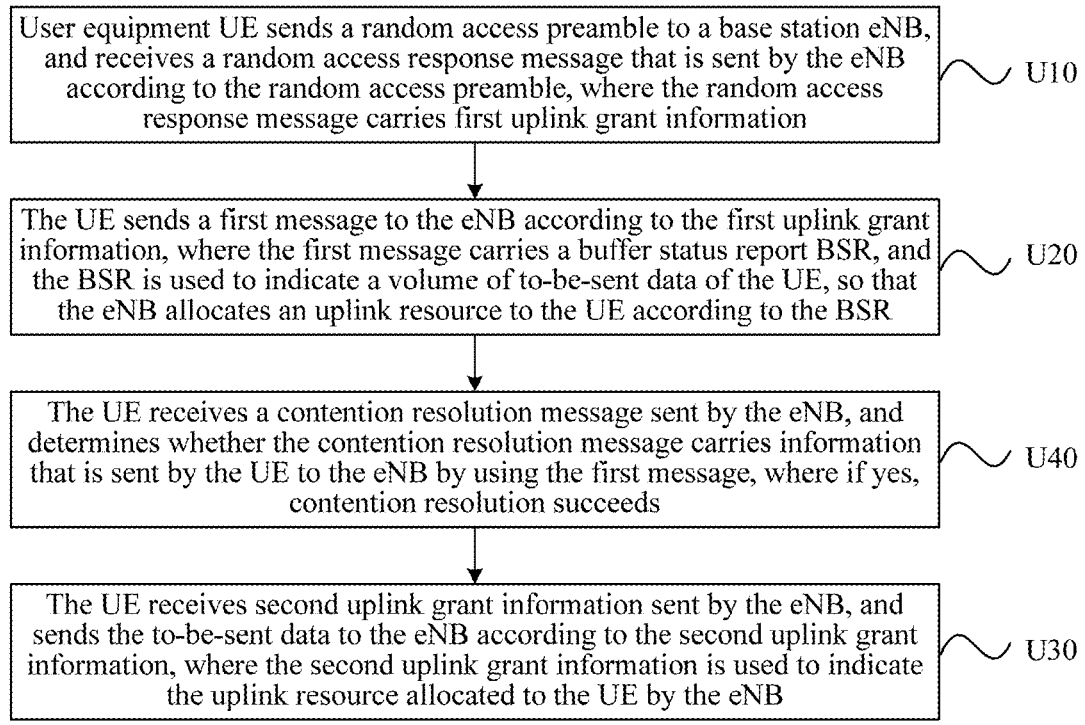
FIG. 4 is a flowchart of another method for random access in an idle state according to an embodiment of the present invention.

FIG. 4 is a flowchart of another method for random access in an idle state according to an embodiment of the present invention. As shown in FIG. 4, in this embodiment, after step U20 in which the UE sends a first message to the eNB, and before step U30 in which the UE receives second uplink grant information sent by the eNB, the method may further include the following step:

Step U40: The UE receives a contention resolution message sent by the eNB, and determines whether the contention resolution message carries information that is sent by the UE to the eNB by using the first message, where if yes, contention resolution succeeds.

Specifically, in an actual application, multiple UEs may initiate a random access process at the same time in a network. In this case, the eNB needs to perform contention resolution. The eNB sends a contention resolution message to the UE, where the contention resolution message may carry one or more of a user equipment identity, a message identifier, and a BSR, that is, the foregoing information may be all or some content of the first message. When receiving the contention resolution message, the UE compares the information carried by the contention resolution message with information of the UE. If the information carried by the contention resolution message is the same as the information of the UE, it is considered that the contention resolution succeeds; if the information carried by the contention resolution message is not the same as the information of the UE, it is considered that the contention resolution fails, and then the UE initiates a random access process for the same objective again, or initiates a traditional random access process. The eNB may further configure a maximum quantity of random access processes for the UE. When a quantity of random access processes initiated by the UE for a same objective reaches the maximum quantity of random access processes, the UE no longer initiates a random access process for the same objective, and no longer initiates a traditional random access process.

In this embodiment, the first message further carries data priority information used to indicate a priority of the to-be-sent data or equipment priority information used to indicate a priority of the UE.

Specifically, the data priority information or the equipment priority information may be implemented by using one or more R bits in the first message shown in FIG. 2. When one R bit is used, two priorities 0/1 may be represented; when two R bits are used, four priorities 00/01/10/11 may be represented; and so on. A specific quantity of R bits used to represent priority information may be specified in a protocol, or may be configured by the eNB, and a specific configuration method may be: notifying the UE by using a system broadcast message. Specifically, a relationship that a priority decreases as a numerical value increases, or an opposite relationship may be specified in a protocol, or may be configured by the eNB, and a specific configuration method may be: notifying the UE by using a system broadcast message. When the first message carries the data priority information, the eNB may also obtain the data priority information while obtaining the BSR of the UE; therefore, the eNB can effectively schedule data of the UE according to a factor such as current load of the eNB. For example, if the UE indicates that data has a high priority, the eNB may preferentially schedule the data, to reduce a data transmission delay; if the UE indicates that data has a low priority, when the eNB is of high load, the eNB may preferentially schedule another UE or other data having a higher priority. When the first message carries the equipment priority information, a processing manner is similar to that for the data priority information, and details are not described herein again. The first message may also carry both the data priority information and the equipment priority information, and the eNB may schedule the UE or the data through comprehensive consideration according to both the priority of the UE and the priority of the to-be-sent data.

In this embodiment, the first message may further carry multiple BSRs. Each BSR represents a buffer size of data of one type, for example, different priority data. A specific method may be adding a data packet header to the first message to indicate a quantity of BSRs carried, for example, reusing LCID=11101 to represent that one type of priority data needs to be sent, reusing LCID=11110 to represent that multiple types of priority data need to be sent, and reusing LCID=11100 to represent that multiple types of priority data need to be sent, but only a buffer size of one type of priority data can be reported.

Figure 5:
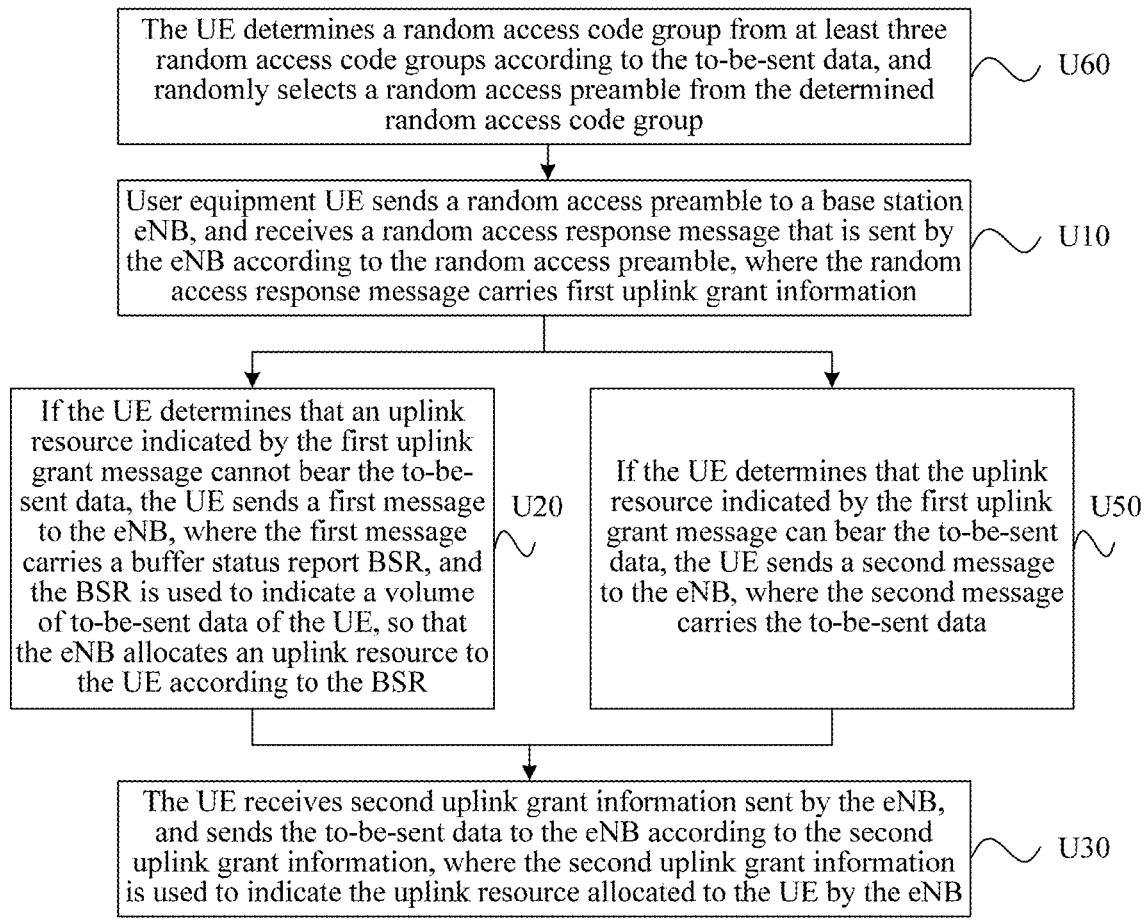
FIG. 5 is a flowchart of another method for random access in an idle state according to an embodiment of the present invention.

FIG. 5 is a flowchart of another method for random access in an idle state according to an embodiment of the present invention. As shown in FIG. 5, in this embodiment, step U20 in which the UE sends a first message to the eNB according to the first uplink grant information may be specifically:

if the UE determines that an uplink resource indicated by the first uplink grant information cannot bear the to-be-sent data, sending, by the UE, the first message to the eNB.

Specifically, the UE may first determine whether the uplink resource indicated by the first uplink grant information can directly bear the to-be-sent data, and if the uplink resource indicated by the first uplink grant information cannot directly bear the to-be-sent data, the UE sends the first message to the eNB, so as to report the BSR to the eNB.

In this embodiment, the method for random access in an idle state further includes the following steps:

Step U50: If the UE determines that the uplink resource indicated by the first uplink grant information can bear the to-be-sent data, the UE sends a second message to the eNB, where the second message carries the to-be-sent data.

Specifically, if the uplink resource indicated by the first uplink grant information can bear the to-be-sent data, the UE may not need to report the BSR, but directly sends the to-be-sent data to the eNB. The second message may also include a message identifier, to distinguish from the first message. The eNB can learn, according to the message identifier of the second message, that an objective of the second message is to directly transmit data. In addition, the UE may also add an identity of the UE to the second message.

In this embodiment, before step U10 in which UE sends a random access preamble to a base station, the method may further include the following step:

Step U60: The UE determines a random access code group from at least three random access code groups according to the to-be-sent data, and selects randomly a random access preamble from the determined random access code group.

Specifically, indication accuracy of the random access preamble can be improved by setting at least three random access code groups. An example in which three random access code groups are set is described, where the three random access code groups are a group A, a group B, and a group C. Two thresholds are set: a threshold 1 and a threshold 2. The threshold 1 and the threshold 2 may be specified in a protocol, or may be configured by the eNB, and a specific configuration method may be: notifying the UE by using a system broadcast message.

When there is data to be sent by the UE: when a volume of the data is less than or equal to the threshold 1, the UE selects a random access preamble from the group A and sends the random access preamble; when the volume of the data is greater than the threshold 1 and less than the threshold 2, the UE selects a random access preamble from the group B and sends the random access preamble; when the volume of the data is greater than or equal to the threshold 2, the UE selects a random access preamble from the group C and sends the random access preamble.

After the eNB receives the random access preamble, if the random access preamble is from the group A, the eNB allocates at least an uplink resource of a volume of the threshold 1 to the UE in the random access response message; if the random access preamble is from the group B or the group C, the eNB allocates at least an uplink resource of a volume of the threshold 2 to the UE in the random access response message. After the UE receives the first uplink grant information in the random access response message, if all data needing to be sent can be transmitted by using the uplink resource indicated by the first uplink grant information, the UE directly sends the data by using the second message; if all data needing to be sent cannot be transmitted by using the uplink resource indicated by the first uplink grant information, the UE first sends the BSR by using the first message, and optionally, some data may be carried.

Further, optionally, in this embodiment, before step U10 in which UE sends a random access preamble to a base station, the method may further include the following step:

Step U60*a*: The UE determines a random access code group from two random access preamble groups according to the to-be-sent data and two thresholds, and randomly selects a random access preamble from the determined random access code group.

Specifically, indication accuracy of the random access preamble can be improved by setting two thresholds. The two thresholds are: a threshold 1 and a threshold 2. The threshold 1 and the threshold 2 may be specified in a protocol, or may be configured by the eNB, and a specific configuration method may be: notifying the UE by using a system broadcast message.

When there is data to be sent by the UE: when a volume of the data is less than or equal to the threshold 1 or the volume of the data is greater than the threshold 2, the UE selects a random access preamble from the group A and sends the random access preamble; when the volume of the data is greater than the threshold 1 and is less than or equal to the threshold 2, the UE selects a random access preamble from the group B and sends the random access preamble.

After the eNB receives the random access preamble, if the random access preamble is from the group A, the eNB allocates at least an uplink resource of a volume of the threshold 1 to the UE in the random access response message; if the random access preamble is from the group B, the eNB allocates at least an uplink resource of a volume of the threshold 2 to the UE in the random access response message.

In the foregoing embodiment, after random access of the UE succeeds, the temporary C-RNTI allocated by the eNB may be retained within a preset time period, for example, a temporary C-RNTI 1 is allocated this time. The preset time period may be specified in a protocol, or may be configured by the eNB, and a specific configuration method may be: notifying the UE by using a system broadcast message. During the retention, when the UE switches into an idle state, and needs to send uplink data again, the UE may request a resource from the eNB again by using a random access process. The random access process may be the same as the random access process in the foregoing embodiment, and details are not described herein again. The random access process initiated again may also be different from the random access process in the foregoing embodiment, and is specifically: The UE sends a random access preamble to a base station, receives a random access response message that is sent by the eNB according to the random access preamble, where the random access response message carries uplink grant information and a temporary C-RNTI 2 that is allocated to the UE by the eNB. The UE sends a message 3 to the eNB according to the uplink grant information. The message 3 carries the temporary C-RNTI 1 retained by the UE and a BSR, and the temporary C-RNTI 2 that is allocated in the random access response message by the eNB is not used.

Specifically, a format of the message 3 may specifically be a message format shown in FIG. 6 or FIG. 7. LCID1=11011 represents that the C-RNTI1 is carried, and LCID2=11000 represents that the BSR is carried. Optionally, the LCID2 may also be equal to 11011, which represents that a Short BSR is carried. In this case, an LCG ID in the Short BSR may be an arbitrary value. After receiving the message 3, the eNB can determine that the resource request is sent by the UE in the idle state, and then allocates an uplink resource to the UE.

FIG. 8 is a flowchart of another method for random access in an idle state according to an embodiment of the present invention. As shown in FIG. 8, the method for random access in an idle state provided in this embodiment may be specifically implemented in combination with the method for random access in an idle state that is applicable to UE and that is provided in any embodiment of the present invention, and a specific implementation process is not described herein again. The method for random access in an idle state provided in this embodiment specifically includes the following steps:

Step S10: A base station receives a random access preamble sent by user equipment UE, and sends a random access response message to the UE according to the random access preamble, where the random access response message carries first uplink grant information.

Step S20: The eNB receives a first message that is sent by the UE according to the first uplink grant information, where the first message carries a buffer status report BSR, and the BSR is used to indicate a volume of to-be-sent data of the UE.

Step S30: The eNB schedules the UE, allocates an uplink resource to the UE according to the BSR, and sends second uplink grant information to the UE, where the second uplink grant information is used to indicate the uplink resource allocated to the UE by the eNB.

According to the method for random access in an idle state provided in this embodiment, UE in an idle state reports a volume of to-be-sent data to an eNB by using a BSR in a random access process, the eNB can accurately allocate an uplink resource to the UE, so that accuracy of uplink resource allocation is improved during random access of the UE in the idle state.

Figure 9:
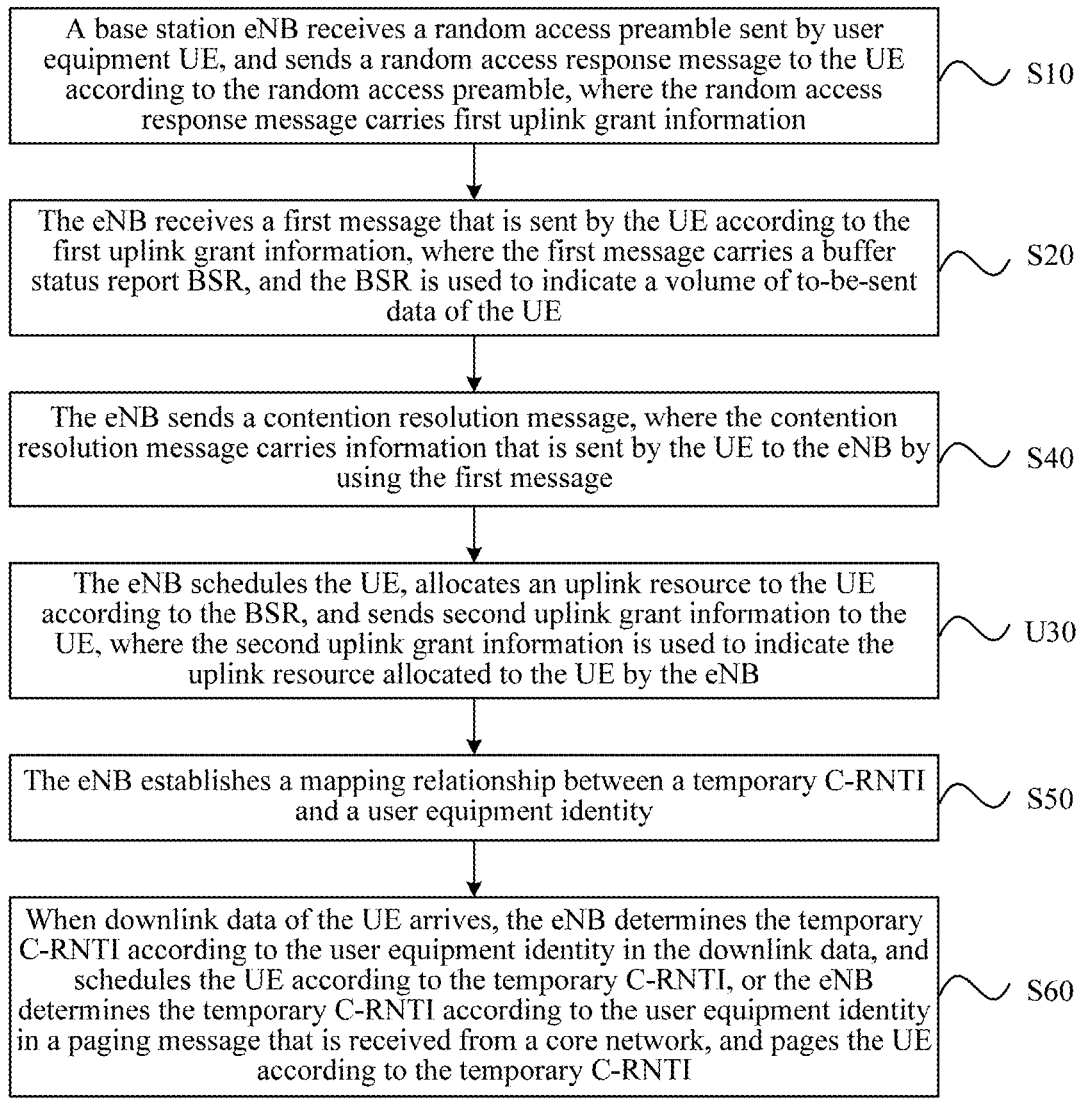
FIG. 9 is a flowchart of another method for random access in an idle state according to an embodiment of the present invention.

FIG. 9 is a flowchart of another method for random access in an idle state according to an embodiment of the present invention. As shown in FIG. 9, in this embodiment, after step S20 in which the eNB receives a first message that is sent by the UE according to the first uplink grant information, and before step S30 in which the eNB allocates an uplink resource to the UE according to the BSR, the method further includes:

Step S40: The eNB sends a contention resolution message, where the contention resolution message carries information that is sent by the UE to the eNB by using the first message.

In this embodiment, the first message further carries data priority information used to indicate a priority of the to-be-sent data or equipment priority information used to indicate a priority of the UE.

Step S30 in which the eNB schedules the UE may be specifically:

scheduling, by the eNB, the UE according to the data priority information or the equipment priority information.

In this embodiment, the random access response message further carries a temporary cell radio network temporary identifier C-RNTI that is allocated to the UE by the eNB, and the first message further carries a user equipment identity. Correspondingly, the method further includes the following steps:

Step S50: The eNB establishes a mapping relationship between the temporary C-RNTI and the user equipment identity.

Step S60: When downlink data of the UE arrives, the eNB determines the temporary C-RNTI according to the user equipment identity in the downlink data, and schedules the UE according to the temporary C-RNTI, or the eNB determines the temporary C-RNTI according to the user equipment identity in a paging message that is received from a core network, and pages the UE according to the temporary C-RNTI.

Specifically, after receiving the first message, the eNB saves the user equipment identity in the first message, and establishes the mapping relationship between the user equipment identity and the temporary C-RNTI. When the UE is in a connected state, and when the downlink data of the UE arrives, the user equipment identity of the UE is obtained from the downlink data, the corresponding temporary C-RNTI is determined according to the mapping relationship, and the corresponding UE is scheduled according to the C-RNTI. Alternatively, when the UE is in an idle state, the eNB receives, from the core network, the paging message to the UE, obtains the user equipment identity of the UE from the paging message, determines the corresponding temporary C-RNTI according to the mapping relationship, and pages the UE according to the C-RNTI.

Figure 10:
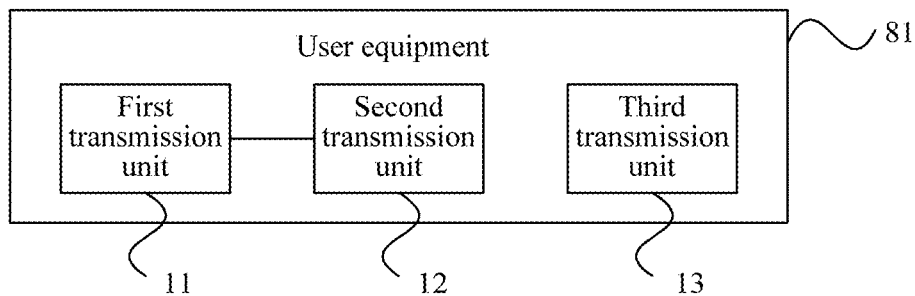
FIG. 10 is a schematic structural diagram of user equipment according to an embodiment of the present invention.

FIG. 10 is a schematic structural diagram of user equipment according to an embodiment of the present invention. As shown in FIG. 10, user equipment 81 provided in this embodiment may specifically implement the steps of the method for random access in an idle state that is applicable to user equipment and that is provided in any embodiment of the present invention, and a specific implementation process is not described herein again. The user equipment 81 provided in this embodiment specifically includes:

a first transmission unit 11, configured to send a random access preamble to abase station, and receive a random access response message that is sent by the eNB according to the random access preamble, where the random access response message carries first uplink grant information;

a second transmission unit 12, configured to send a first message to the eNB according to the first uplink grant information, where the first message carries a buffer status report BSR, and the BSR is used to indicate a volume of to-be-sent data of the UE, so that the eNB allocates an uplink resource to the UE according to the BSR; and a third transmission unit 13, configured to receive second uplink grant information sent by the eNB, and send the to-be-sent data to the eNB according to the second uplink grant information, where the second uplink grant information is used to indicate the uplink resource allocated to the user equipment UE by the eNB.

According to the user equipment provided in this embodiment, because the UE in an idle state reports a volume of to-be-sent data to an eNB by using a BSR in a random access process, the eNB can accurately allocate an uplink resource to the UE, so that accuracy of uplink resource allocation is improved during random access of the UE in the idle state.

In this embodiment, the BSR is a short BSR or a long BSR.

Figure 11:
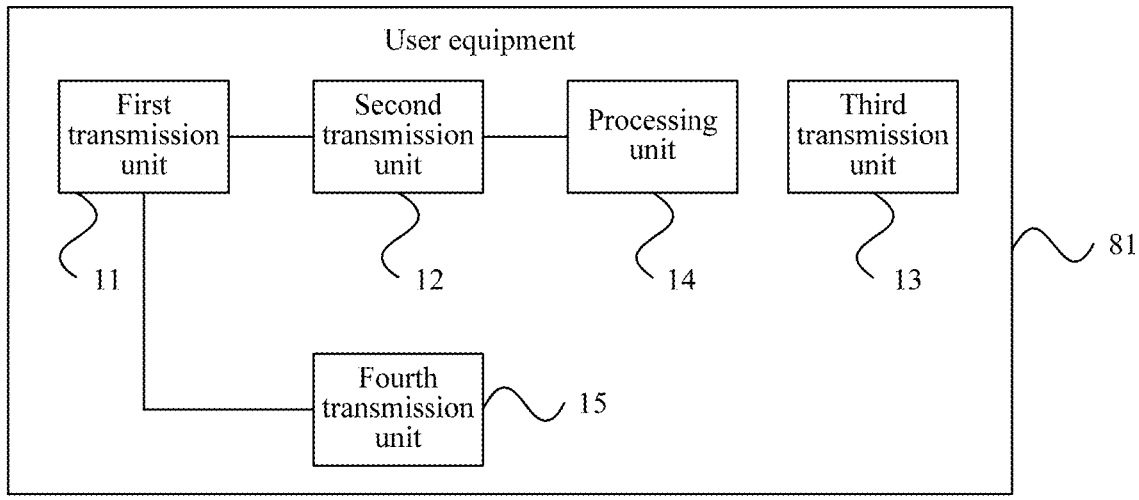
FIG. 11 is a schematic structural diagram of another user equipment according to an embodiment of the present invention.

FIG. 11 is a schematic structural diagram of another user equipment according to an embodiment of the present invention. As shown in FIG. 11, in this embodiment, the second transmission unit 12 may be further configured to receive a contention resolution message sent by the eNB. Correspondingly, the user equipment 81 may further include a processing unit 14. The processing unit 14 is configured to determine whether the contention resolution message carries information that is sent by the UE to the eNB by using the first message, where if yes, contention resolution succeeds.

In this embodiment, the first message further carries data priority information used to indicate a priority of the to-be-sent data or equipment priority information used to indicate a priority of the UE.

In this embodiment, the second transmission unit 12 may be specifically configured to: if it is determined that an uplink resource indicated by the first uplink grant information cannot bear the to-be-sent data, send the first message to the eNB.

In this embodiment, the user equipment 81 may further include a fourth transmission unit 15. The fourth transmission unit 15 is configured to: if it is determined that the uplink resource indicated by the first uplink grant information can bear the to-be-sent data, send a second message to the eNB, where the second message carries the to-be-sent data.

In this embodiment, the first transmission unit 11 may be further configured to determine a random access code group from at least three random access code groups according to the to-be-sent data, and randomly select a random access preamble from the determined random access code group.

In this embodiment, the first message further includes: a message identifier used to indicate that the first message carries the BSR, and a UE identity, where the message identifier of the BSR includes a logical channel number, and the UE identity includes a temporary mobile subscriber identity, an international mobile subscriber identity, or an international mobile equipment identity of the UE.

In this embodiment, the second transmission unit 12 may be further configured to receive a BSR configuration parameter delivered by a network side device, and generate the BSR according to the BSR configuration parameter.

Figure 12:
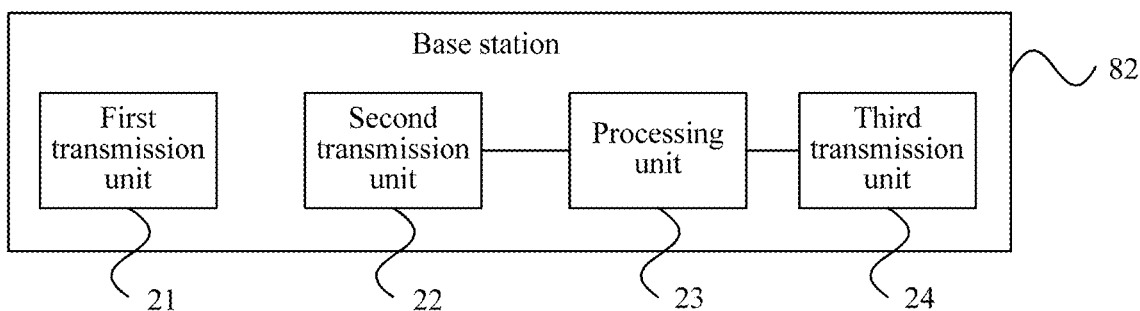
FIG. 12 is a schematic structural diagram of a base station according to an embodiment of the present invention.

FIG. 12 is a schematic structural diagram of a base station according to an embodiment of the present invention. As shown in FIG. 12, a base station 82 provided in this embodiment may specifically implement the steps of the method for random access in an idle state that is applicable to a base station and that is provided in any embodiment of the present invention, and a specific implementation process is not described herein again. The base station 82 provided in this embodiment specifically includes:

a first transmission unit 21, configured to receive a random access preamble sent by user equipment UE, and send a random access response message to the UE according to the random access preamble, where the random access response message carries first uplink grant information;

a second transmission unit 22, configured to receive a first message that is sent by the UE according to the first uplink grant information, where the first message carries a buffer status report BSR, and the BSR is used to indicate a volume of to-be-sent data of the UE;

a processing unit 23, configured to schedule the UE, and allocate an uplink resource to the UE according to the BSR; and a third transmission unit 24, configured to send second uplink grant information to the UE, where the second uplink grant information is used to indicate the uplink resource allocated to the UE by the base station.

According to the base station provided in this embodiment, UE in an idle state reports a volume of to-be-sent data to a base station by using a BSR in a random access process, the eNB can accurately allocate an uplink resource to the UE, so that accuracy of uplink resource allocation is improved during random access of the UE in the idle state.

In this embodiment, the second transmission unit 22 may be further configured to send a contention resolution message, where the contention resolution message carries information that is sent by the UE to the eNB by using the first message.

In this embodiment, the first message further carries data priority information used to indicate a priority of the to-be-sent data or equipment priority information used to indicate a priority of the UE. The processing unit 23 may be specifically configured to schedule the UE according to the data priority information or the equipment priority information.

In this embodiment, the random access response message further carries a temporary cell radio network temporary identifier C-RNTI that is allocated to the UE by the eNB, and the first message further carries a user equipment identity. The processing unit 23 may be further configured to establish a mapping relationship between the temporary C-RNTI and the user equipment identity; and when downlink data of the UE arrives, determine, by the eNB, the temporary C-RNTI according to the user equipment identity in the downlink data, and schedule the UE according to the temporary C-RNTI, or determine, by the eNB, the temporary C-RNTI according to the user equipment identity in a paging message that is received from a core network, and page the UE according to the temporary C-RNTI.

In this embodiment, the first message may further include: a message identifier used to indicate that the first message carries the BSR, and a UE identity, where the message identifier of the BSR includes a logical channel number, and the UE identity includes a temporary mobile subscriber identity, an international mobile subscriber identity, or an international mobile equipment identity of the UE.

Figure 13:
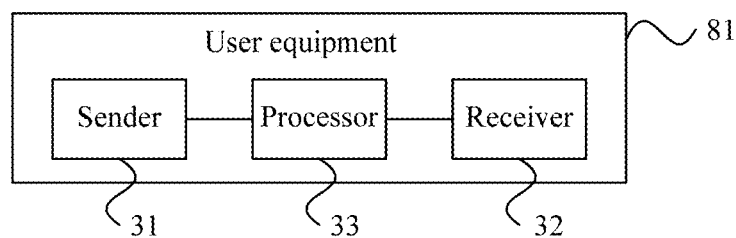
FIG. 13 is a schematic structural diagram of another user equipment according to an embodiment of the present invention.

FIG. 13 is a schematic structural diagram of another user equipment according to an embodiment of the present invention. As shown in FIG. 13, user equipment 81 provided in this embodiment may specifically implement the steps of the method for random access in an idle state that is applicable to user equipment and that is provided in any embodiment of the present invention, and a specific implementation process is not described herein again. The user equipment 81 provided in this embodiment specifically includes:

a sender 31, configured to send a random access preamble to a base station;

a receiver 32, configured to receive a random access response message that is sent by the eNB according to the random access preamble, where the random access response message carries first uplink grant information; and a processor 33, configured to send a first message to the eNB according to the first uplink grant information by using the sender 31, where the first message carries a buffer status report BSR, and the BSR is used to indicate a volume of to-be-sent data of the UE, so that the eNB allocates an uplink resource to the UE according to the BSR, where the receiver 32 is further configured to receive second uplink grant information sent by the eNB, where the second uplink grant information is used to indicate the uplink resource allocated to the user equipment UE by the eNB; and the processor 33 is further configured to send the to-be-sent data to the eNB according to the second uplink grant information by using the sender 31.

According to the user equipment provided in this embodiment, because the UE in an idle state reports a volume of to-be-sent data to an eNB by using a BSR in a random access process, the eNB can accurately allocate an uplink resource to the UE, so that accuracy of uplink resource allocation is improved during random access of the UE in the idle state.

In this embodiment, the BSR is a short BSR or a long BSR.

In this embodiment, the receiver 32 may be further configured to receive a contention resolution message sent by the eNB; and the processor 33 may be further configured to determine whether the contention resolution message carries information that is sent by the UE to the eNB by using the first message, where if yes, contention resolution succeeds.

In this embodiment, the first message further carries data priority information used to indicate a priority of the to-be-sent data or equipment priority information used to indicate a priority of the UE.

In this embodiment, the processor 33 may be further configured to: if determining that an uplink resource indicated by the first uplink grant information cannot bear the to-be-sent data, send the first message to the eNB by using the sender 31.

In this embodiment, the processor 33 may be further configured to: if determining that the uplink resource indicated by the first uplink grant information can bear the to-be-sent data, send a second message to the eNB by using the sender 31, where the second message carries the to-be-sent data.

In this embodiment, the processor 33 may be further configured to determine a random access code group from at least three random access code groups according to the to-be-sent data, and randomly select a random access preamble from the determined random access code group.

In this embodiment, the first message further includes: a message identifier used to indicate that the first message carries the BSR, and a UE identity, where the message identifier of the BSR includes a logical channel number, and the UE identity includes a temporary mobile subscriber identity, an international mobile subscriber identity, or an international mobile equipment identity of the UE.

In this embodiment, the receiver 32 may be further configured to receive a BSR configuration parameter delivered by a network side device, and generate the BSR according to the BSR configuration parameter.

Figure 14:
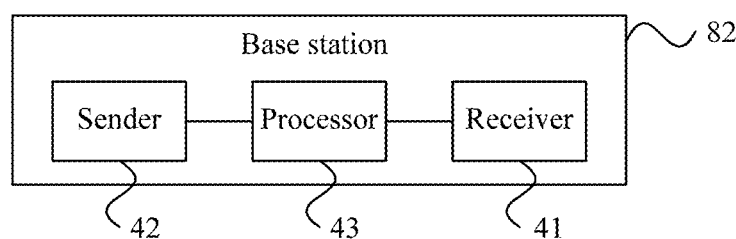
FIG. 14 is a schematic structural diagram of another base station according to an embodiment of the present invention.

FIG. 14 is a schematic structural diagram of another base station according to an embodiment of the present invention. As shown in FIG. 14, a base station 82 provided in this embodiment may specifically implement the steps of the method for random access in an idle state that is applicable to a base station and that is provided in any embodiment of the present invention, and a specific implementation process is not described herein again. The base station 82 provided in this embodiment specifically includes:

a receiver 41, configured to receive a random access preamble sent by user equipment UE;

a sender 42, configured to send a random access response message to the UE according to the random access preamble, where the random access response message carries first uplink grant information, where the receiver 41 is further configured to receive a first message that is sent by the UE according to the first uplink grant information, where the first message carries a buffer status report BSR, and the BSR is used to indicate a volume of to-be-sent data of the UE; and a processor 43, configured to schedule the UE, and allocate an uplink resource to the UE according to the BSR, where the sender 42 is further configured to send second uplink grant information to the UE, where the second uplink grant information is used to indicate the uplink resource allocated to the UE by the base station.

According to the base station provided in this embodiment, UE in an idle state reports a volume of to-be-sent data to a base station by using a BSR in a random access process, the eNB can accurately allocate an uplink resource to the UE, so that accuracy of uplink resource allocation is improved during random access of the UE in the idle state.

In this embodiment, the sender 42 may be further configured to send a contention resolution message, where the contention resolution message carries information that is sent by the UE to the eNB by using the first message.

In this embodiment, the first message may further carry data priority information used to indicate a priority of the to-be-sent data or equipment priority information used to indicate a priority of the UE. The processor 43 may be specifically configured to schedule the UE according to the data priority information or the equipment priority information.

In this embodiment, the random access response message further carries a temporary cell radio network temporary identifier C-RNTI that is allocated to the UE by the eNB, and the first message further carries a user equipment identity. The processor 43 may be further configured to establish a mapping relationship between the temporary C-RNTI and the user equipment identity; and when downlink data of the UE arrives, determine, by the eNB, the temporary C-RNTI according to the user equipment identity in the downlink data, and schedule the UE according to the temporary C-RNTI, or determine, by the eNB, the temporary C-RNTI according to the user equipment identity in a paging message that is received from a core network, and page the UE according to the temporary C-RNTI.

In this embodiment, the first message may further include: a message identifier used to indicate that the first message carries the BSR, and a UE identity, where the message identifier of the BSR includes a logical channel number, and the UE identity includes a temporary mobile subscriber identity, an international mobile subscriber identity, or an international mobile equipment identity of the UE.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for random access in an idle state, the method comprising:
    processing, by user equipment (UE), to-be-sent data, including generating a buffer status report (BSR) for indicating a volume of to-be-sent data of the UE, and equipment priority information for indicating a scheduling priority of the UE;
    sending, by the UE, a random access preamble to an evolved NodeB (eNB), and receiving a random access response message sent by the eNB according to the random access preamble, wherein the random access response message carries first uplink grant information;
    sending, by the UE, a first message to the eNB according to the first uplink grant information, wherein the first message comprises R bits, and wherein the first message carries the BSR and the equipment priority information, and the equipment priority information are carried in the R bits; and
    receiving, by the UE, second uplink grant information sent by the eNB, and sending the to-be-sent data to the eNB over an uplink resource according to the second uplink grant information, wherein the second uplink grant information indicates the uplink resource allocated to the UE by the eNB according to the BSR and the equipment priority information.

2. The method for random access in an idle state according to claim 1, wherein the first message further carries data priority information for indicating a priority of the to-be-sent data, and the uplink resource is allocated to the UE by the eNB according to the BSR, the equipment priority information, and the data priority information.

3. The method for random access in an idle state according to claim 1, wherein sending, by the UE, the first message to the eNB according to the first uplink grant information comprises:
    when the UE determines that an uplink resource indicated by the first uplink grant information cannot bear the to-be-sent data, sending, by the UE, the first message to the eNB.

4. The method for random access in an idle state according to claim 3, further comprising:
    when the UE determines that the uplink resource indicated by the first uplink grant information can bear the to-be-sent data, sending, by the UE, a second message to the eNB, wherein the second message carries the to-be-sent data.

5. The method for random access in an idle state according to claim 1, wherein the first message further comprises:
    a message identifier for indicating that the first message carries the BSR, and a UE identity, wherein the message identifier of the BSR comprises a logical channel number, and the UE identity comprises a temporary mobile subscriber identity, an international mobile subscriber identity, or an international mobile equipment identity of the UE.

6. The method for random access in an idle state according to claim 1, wherein before sending, by the UE, the first message to the eNB according to the first uplink grant information, the method further comprises:
  receiving, by the UE, a BSR configuration parameter delivered by a network side device, and generating the BSR according to the BSR configuration parameter.

7. A method for random access in an idle state, the method comprising:
  receiving, by an evolved NodeB (eNB), a random access preamble sent by user equipment (UE), and sending a random access response message to the UE according to the random access preamble, wherein the random access response message carries first uplink grant information;
  receiving, by the eNB, a first message sent by the UE according to the first uplink grant information, wherein the first message comprises R bits, and wherein the first message carries a buffer status report (BSR) and equipment priority information for indicating a scheduling priority of the UE, and the BSR is used to indicate a volume of to-be-sent data of the UE, and wherein the equipment priority information is carried in the R bits of the first message; and
  allocating, by the eNB, an uplink resource to the UE according to the BSR and the equipment priority information and sending second uplink grant information to the UE for indicating the uplink resource allocated to the UE by the eNB.

8. The method for random access in an idle state according to claim 7, wherein after receiving, by the eNB, the first message sent by the UE according to the first uplink grant information, and before allocating, by the eNB, the uplink resource to the UE according to the BSR, the method further comprises:
  sending, by the eNB, a contention resolution message that carries information sent by the UE to the eNB by using the first message.

9. The method for random access in an idle state according to claim 7, wherein:
  the first message further carries data priority information for indicating a priority of the to-be-sent data; and
  the eNB schedules the UE according to the data priority information and the equipment priority information.

10. The method for random access in an idle state according to claim 7, wherein:
  the random access response message further carries a temporary cell radio network temporary identifier (C-RNTI) allocated to the UE by the eNB, and the first message further carries a user equipment identity; and
  the method further comprises:
  establishing, by the eNB, a mapping relationship between the temporary C-RNTI and the user equipment identity, and
  when downlink data of the UE arrives, determining, by the eNB, the temporary C-RNTI according to the user equipment identity in the downlink data, and scheduling the UE according to the temporary C-RNTI, or determining, by the eNB, the temporary C-RNTI according to the user equipment identity in a paging message received from a core network, and paging the UE according to the temporary C-RNTI.

11. The method for random access in an idle state according to claim 7, wherein the first message further comprises:
  a message identifier for indicating that the first message carries the BSR, and a UE identity, wherein the message identifier of the BSR comprises a logical channel number, and the UE identity comprises a temporary mobile subscriber identity, an international mobile subscriber identity, or an international mobile equipment identity of the UE.

12. User equipment (UE), comprising:
  a sender, configured to send a random access preamble to an evolved NodeB (eNB);
  a receiver, configured to receive a random access response message sent by the eNB according to the random access preamble, wherein the random access response message carries first uplink grant information;
  a processor, configured to generate an equipment priority information for indicating a scheduling priority of the UE, and to send a first message to the eNB according to the first uplink grant information by using the sender, wherein the first message carries a buffer status report (BSR) for indicating a volume of to-be-sent data of the UE and the equipment priority information, and wherein the first message comprises R bits, and the equipment priority information are carried in the R bits;
  wherein the receiver is further configured to receive second uplink grant information sent by the eNB, wherein the second uplink grant information indicates uplink resource allocated to the UE by the eNB according to the BSR and the equipment priority information; and
  wherein the processor is further configured to send the to-be-sent data to the eNB according to the second uplink grant information by using the sender.

13. The user equipment according to claim 12, wherein the first message further carries data priority information for indicating a priority of the to-be-sent data, and the uplink resource is allocated to the UE by the eNB according to the BSR, the equipment priority information, and the data priority information.

14. The user equipment according to claim 12, wherein the processor is further configured to:
  when determining that an uplink resource indicated by the first uplink grant information cannot bear the to-be-sent data, send the first message to the eNB by using the sender.

15. The user equipment according to claim 14, wherein the processor is further configured to:
  when determining that the uplink resource indicated by the first uplink grant information can bear the to-be-sent data, send a second message to the eNB by using the sender, wherein the second message carries the to-be-sent data.

16. The user equipment according to claim 12, wherein the first message further comprises:
  a message identifier for indicating that the first message carries the BSR, and a UE identity, wherein the message identifier of the BSR comprises a logical channel number, and the UE identity comprises a temporary mobile subscriber identity, an international mobile subscriber identity, or an international mobile equipment identity of the UE.

17. The user equipment according to claim 12, wherein the receiver is further configured to receive a BSR configuration parameter delivered by a network side device, and generate the BSR according to the BSR configuration parameter.

18. A base station, comprising:
  a receiver, configured to receive a random access preamble sent by user equipment (UE);
  a sender, configured to send a random access response message to the UE according to the random access preamble, wherein the random access response message carries first uplink grant information;

wherein the receiver is further configured to receive a first message, comprising R bits, sent by the UE according to the first uplink grant information, wherein the first message carries a buffer status report (BSR) for indicating a volume of to-be-sent data of the UE and equipment priority information for indicating a scheduling priority of the UE, and wherein the equipment priority information is carried in the R bits;

a processor, configured to schedule the UE, and allocate an uplink resource to the UE according to the BSR and the equipment priority information; and wherein the sender is further configured to send second uplink grant information to the UE for indicating the uplink resource allocated to the UE by the base station.

19. The base station according to claim 18, wherein the sender is further configured to:

send a contention resolution message that carries information sent by the UE to the eNB by using the first message.

20. The base station according to claim 18, wherein:

the first message further carries data priority information for indicating a priority of the to-be-sent data; and the processor is configured to schedule the UE according to the data priority information and the equipment priority information.

21. The base station according to claim 18, wherein:

the random access response message further carries a temporary cell radio network temporary identifier (C-RNTI) allocated to the UE by the base station, and the first message further carries a user equipment identity; and the processor is further configured to establish a mapping relationship between the temporary C-RNTI and the user equipment identity, and when downlink data of the UE arrives, determine the temporary C-RNTI according to the user equipment identity in the downlink data, and schedule the UE according to the temporary C-RNTI, or determine the temporary C-RNTI according to the user equipment identity in a paging message received from a core network, and page the UE according to the temporary C-RNTI.

22. The base station according to claim 18, wherein the first message further comprises:

a message identifier for indicating that the first message carries the BSR, and a UE identity, wherein the message identifier of the BSR comprises a logical channel number, and the UE identity comprises a temporary mobile subscriber identity, an international mobile subscriber identity, or an international mobile equipment identity of the UE.

* * * * *